Dec. 20, 1966     L. D. KELLER ET AL     3,292,803
SEMI-TRAILER

Filed Aug. 26, 1963     5 Sheets-Sheet 1

INVENTORS
LYLE D. KELLER
BY ROBERT M. BARNHART
TW Secrest

Dec. 20, 1966  L. D. KELLER ET AL  3,292,803
SEMI-TRAILER

Filed Aug. 26, 1963  5 Sheets-Sheet 2

INVENTORS
BY LYLE D. KELLER
ROBERT M. BARNHART

TW Secrest

Dec. 20, 1966    L. D. KELLER ET AL    3,292,803
SEMI-TRAILER

Filed Aug. 26, 1963    5 Sheets-Sheet 3

INVENTORS
LYLE D. KELLER
ROBERT M. BARNHART

Dec. 20, 1966   L. D. KELLER ET AL   3,292,803
SEMI-TRAILER

Filed Aug. 26, 1963   5 Sheets-Sheet 4

INVENTORS
LYLE D. KELLER
ROBERT M. BARNHART

3,292,803
SEMI-TRAILER
Lyle D. Keller and Robert M. Barnhart, Seattle, Wash., assignors to Kneeling Nellie, Inc., Seattle, Wash., a corporation of Washington
Filed Aug. 26, 1963, Ser. No. 304,352
9 Claims. (Cl. 214—506)

This invention relates to a method and apparatus for unloading a trailer. As used herein, "trailer" means the type of vehicle having a rear wheel carriage and the front end of which is supported by a kingpin on the fifth wheel of a tractor. This type is also known and sometimes herein designated as a "semi-trailer."

Prior to our invention one of the conventional practices of transporting groceries and dry goods to a commercial distribution center such as a store was to first load the merchandise at a warehouse. At the warehouse there was a dock which was approximately three-and-one-half to five feet above ground level. The trailer, which was detachable from a tractor was backed to the dock so that the bed of the trailer and the dock were approximately the same height, within a foot of each other. Then, planks were laid from the dock to the trailer so that a warehouseman could load case goods from the dock into the trailer. As for example, the warehouseman could load from five to seven cases of groceries by means of a hand truck by wheeling the hand truck from the dock to the trailer. Or, the warehouseman could load from ten to fifteen cases of groceries on a stock cart by wheeling the same from the dock onto the trailer. Then, the trailer was moved to the retail store for distribution. In certain instances there may have been a dock at the store. Usually there was not a dock. The trailer was parked for unloading. This operation required a relatively large maneuvering area. At the warehouse, there was normally a large maneuvering area for the tractor and trailer. However, at the retail store there was not always a large maneuvering area. Sometimes, it was difficult to back the trailer to the dock or the receiving door. At this time the driver moved the merchandise from the trailer to the ground level. The clerk by means of a hand cart or stock cart could move approximately five to seven cases or ten to fifteen cases with each trip from the ground level to the warehouse area in the retail store. Normally, most retail stores had some warehousing area for such a purpose as to allow the clerk to move the goods from the ground level to the warehousing area and then from the warehousing area to the shelves in the store. This method of loading and unloading a trailer requires at least one warehouseman at the receiving door and one clerk at the store. In addition, the tractor is immobile as it is attached to the trailer. And, the truck driver is immobilized with the tractor.

In addition to this method for loading and unloading a trailer there are other methods. One of these comprises the use of gravity roller conveyer systems. A truck driver backs a semi-trailer as close as practicable to a receiving door. One or more of the store personnel and the truck driver set up the roller conveyer leading from the trailer and then they begin unloading. The driver works inside the trailer placing one package or carton at a time on the roller and the store personnel remove and stack up the cartons in the receiving area on the floor of the warehouse area. The average load consists of 1,000 or more cartons. From this it is seen that the unloading time is long; there is immobilized an expensive tractor and semi-trailer; and there is required the services of one or more clerks and a driver. Another method requires the use of either a powered tailgate lift or a stationary elevator installed at the unloading area. In either case the driver by means of a pallet jack places a pallet load of merchandise on the lift platform and lowers it from the trailer to the ground level and then pulls it into the receiving area. After the pallet is placed in the receiving area the driver pulls his jack back on the platform and rides back up to the deck level of the trailer, and repeats the operation with the next pallet. Due to the fact the lift platform is kept to minimum dimensions, especially length, to keep down weight and to have lifting capacity as high as possible, the driver has to be very cautious in pulling the pallet across the threshold of the trailer onto the lift platform which makes for a long "Cycle" time, i.e., the time required for the driver to place a pallet on the lift, lower to the ground, place in the receiving area and then ride back to deck level. Considering that a trailer may be loaded with approximately 28 pallets the time that the equipment is tied up in the unloading operation is long. Also, there is a considerable potential hazard of a misstep or failure of the lifting and lowering device where a driver is actually riding along with the merchandise is considerable. The maintenance of the lift platform may be great as the mechanism has to work approximately 28 up and down cycles in order to unload the trailer. The damage to "tailgate lifts" due to backing into loading docks and loading across the gate is a continuous maintenance problem. A pallet may carry an average of 35 or more cartons.

A summary of various methods for loading a trailer and for unloading a trailer is as follows. One method may use a gravity or power conveyer. The use of the conveyer requires the depositing of a case of merchandise on one end and the removal of the case from the other end of the conveyer. The conveyer may be used for conveying the merchandise from outside the trailer to the inside of the trailer and then from the inside of the trailer to the outside of the trailer. With the use of the conveyer there are required at least two warehousemen. Another method comprises the use of a handtruck. With a handtruck there are stacked approximately from five to seven cases of merchandise in a vertical stack on the handtruck. Then the truck is moved by manual means to the trailer and the five to seven cases are stacked inside the trailer. In some instances the cases may be stacked in one operation in the vertical stack, and in other instances the cases may be stacked one case at a time. The converse of this operation is employed in wheeling the merchandise to the rear of the trailer and unloading the merchandise to the ground level by hand. Then wheeling the merchandise into the retail store by hand truck. A third method is by the use of a platform truck. A platform truck may be capable of handling ten to 100 cases. The truck is wheeled into the trailer and then the individual cases removed and deposited in the trailer by the warehouseman. This method employs the lifting of the individual cases from the platform truck to the floor of the trailer. Again the converse of this operation is moving the merchandise to the rear of the trailer and unloading the merchandise to the stock cart on the ground level by hand. Then wheeling the merchandise into the receiving area. As is seen the use of the handtruck and a platform truck may require a great deal of individual labor in loading and unloading the truck as each piece of merchandise must be handled individually. A fourth method is by the use of pallets and a fork-lift truck, or by the use of pallets with a manual or mechanical pallet jack. This method requires a loading dock. With this type of handling the warehouseman moves from 35 to 70 cases of merchandise onto a pallet, and then the pallet onto the trailer with a fork-lift truck or equivalent. The pallet is depositioned on the floor of the trailer without individually removing each case from the pallet and stacking in the trailer. The load for the trailer is actually built on the pallet and becomes the increment of the load for the trailer without the rehandling of the merchandise. The converse of this operation is true in the unloading of the trailer. More particularly, the pallet is lifted and taken off of the trailer to a desired location. This requires a trailer dock level receiving dock connected to the floor level of the retail store.

With this background of moving case goods and groceries from a trailer to a retail store we have invented a new trailer and a new method for moving case goods from a warehouse to a trailer, and then from the trailer to the retail stored. More particularly, with our trailer it is possible for the tractor to pull the trailer into the loading area and unload. It is not necessary to have a dock at the loading area or to back the trailer towards the dock. The tractor and trailer are unhooked and then one end of the trailer is lowered. A ramp is extended from the lowered end of the trailer and a warehouseman by means of a fork-fit truck can move a pallet load of case goods onto the trailer. There may be approximately 35 or more cases on the pallet. By means of a manually operated fork-lift truck or a hand pallet jack a man may move this large number of cases onto the trailer, and the pallet is left in the trailer. The trailer is raised and then pulled by a tractor to a store. Again, the tractor pulls the trailer to a convenient spot and dispenses with the backing of the trailer towards the dock as a dock is not necessary. Then, the tractor and trailer are uncoupled and one end of the trailer is lowered. The warehouseman or truck driver by means of a manually operated fork-lift truck or hand pallet jack moves the pallet from the trailer and to the shelf area or to the distribution area of the store proper. As is seen in comparison with the various conventional methods listed of unloading a trailer there is eliminated the individual case handling, requirement of a dock, elevator, or lift gate in unloading the trailer. The merchandise on pallets is in a fluid state of storage and can be moved easily from the trailer through the receiving area directly to the sales area or retail shelf. In this manner it is possible to save both in time and manpower by wheeling the case goods directly from the trailer to the shelf area. Accordingly, an object of this invention is to provide a trailer which requires a relatively small maneuvering area to position the trailer for unloading and loading as compared with relatively large maneuvering areas as required for the conventional trailers; a trailer which may be loaded and unloaded in the parking area and which does not need a dock of a specified height for loading and unloading; a trailer which is versatile in regard to loading as it can be loaded and unloaded at conventional loading facilities and also at ground level; an invention which can be adapted for any size trailer from the relatively short trailers to relatively long trailers; a trailer which makes it possible to load pallets at a central location or warehouse, convey the pallets onto the trailer, transport the trailer to a store, and wheel the pallets off of the trailer and to a predetermined place in an aisle in the store; a trailer which makes it possible to save both time and expense in the handling of items and the transporting of these items from one place to another as one warehouseman can handle more items with this trailer than his counterpart can in using prior conventional trailers; a trailer which makes it possible to reduce warehousing area at the point of distribution such as the retail store, the sales area of the retail store can be used as a temporary facility for the discharge of merchandise; a trailer which makes it possible to increase the sales area at the point of retail distribution as there is less need for a warehousing area at the point of distribution; a trailer which makes it possible to have a less expensive retail outlet store as the available store area is used for merchandising and selling area and not for a warehousing area thereby making it possible for a given selling area to have less warehousing area; a trailer which makes it possible to build a display at a central location such as a warehouse and transport the display on pallets to the retail distribution area for merchandising purposes; a trailer, which makes it possible in a given size of a store lot to have more available area for the store and less area required for unloading the trailer at the retail distribution outlet; a trailer which embodies this invention is a self-contained unit and does not need special equipment for loading and unloading; a trailer having a free frontal area available for loading and unloading; a trailer which embodies this invention has an inherently greater efficiency in unloading since the slope of the trailer creates gravity power, the driver does not have to exert energy to unload the trailer; and, a trailer which is relatively inexpensive to manufacture and to maintain.

These and other important objects and advantages will be more particularly brought forth upon reference to the accompanying drawings, the detailed specification of the invention and the appended claims.

Figure 6:
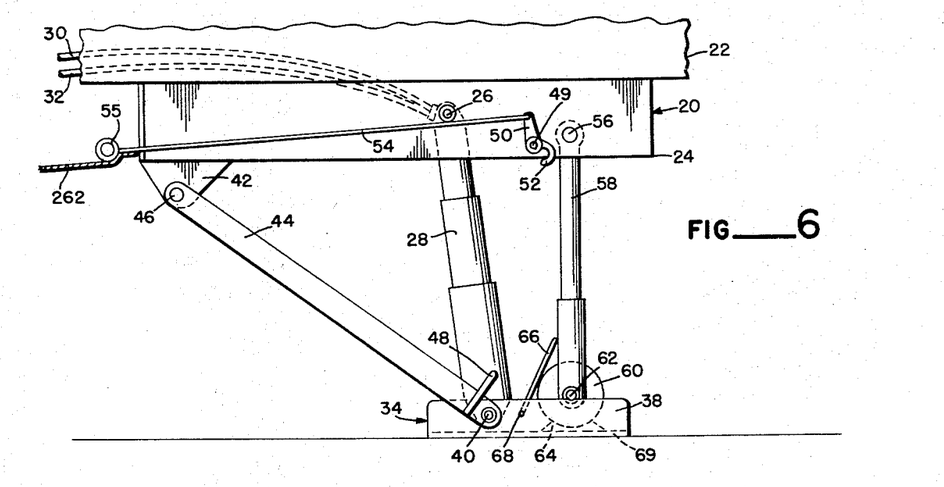
FIGURE 6, on an enlarged scale, is a side-elevational view of one species of the invention, viz., a fluid actuated supporting leg, and illustrates the same in an extended position and supporting a trailer.
Figure 7:
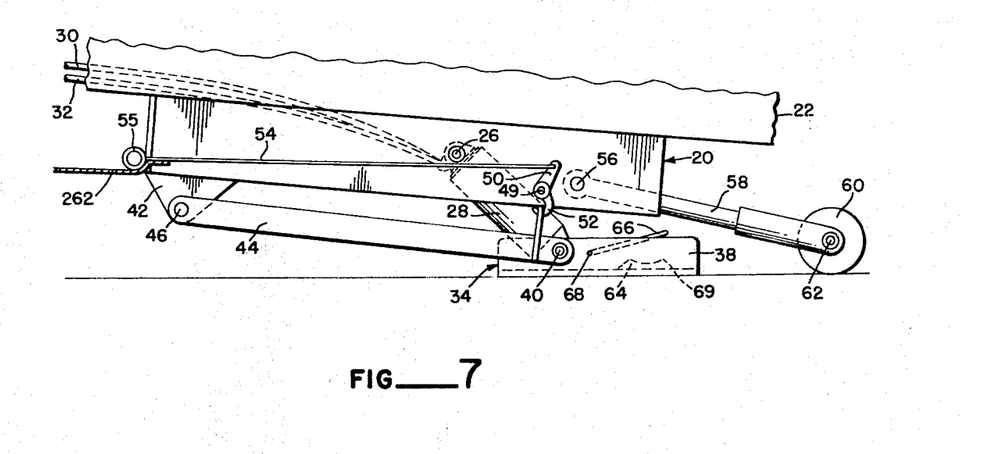
FIGURE 7 is a side-elevational view of the fluid actuated supporting leg in a retracted position and not supporting a trailer so that the front end of the trailer is sloping downwardly.

In FIGURES 6 and 7 there is an enlarged illustration of one species of the supporting leg. This species is a raising and lowering device 20 and is attached to the underneath side of a bed 22 of a trailer. Bed 22 has a bottom 22b which, as will be apparent from FIG. 4, rests upon the ground at its front end when the trailer is uncoupled from the tractor by which it is pulled and the jack mechanism described hereinafter is retracted. On the upper side of bed 22 is a floor surface 22f on which the cargo is supported. The device 20 comprises a housing 24. The housing 24 is attached to or connected with the bed 22. At approximately the center position or slightly forward of the central position of the housing 24 there is a pivot or pin 26. Pivotally mounted on this pin 26 is a fluid actuated cylinder 28. The cylinder 28 in effect is a three stage hydraulic cylinder with appropriate plungers and has two lead lines 30 and 32. The lower end of the cylinder 28 connects with a shoe 34. More particularly, the shoe 34 comprises a housing having a flat base plate 36 and sides 38. The cylinder 28 connects with the shoe 34 by means of a pivot 40. The shoe 34 functions to provide a larger bearing surface so as to distribute the weight of the trailer over a larger area so that the trailer can be on various surfaces such as asphalt and concrete. At the rear of the housing 20 there is a depending lug 42. A stabilizing bar 44 is pivotally mounted to this lug by means of a pin 46. The lower end of the stabilizing bar is also pivotally mounted on the pin 40. Near the pin 40 and directed upwardly is a yoke or loop 48. Forward of the pin 26 there is a pivot pin 48 on the housing 24. Mounted on this pivot pin 49 is an arm 50 and a hook 52. The hook 52 depends downwardly and is integral with the arm 50. A rod or a pull rod 54 connects with the arm 50. By pulling on the rod 54 it is possible to rotate the hook 52. In FIGURE 7 it is seen that with the cylinder 28 in a retracted state that the hook 52 fits with the loop 48. With the trailer in the raised position and positioned on the tractor this hook 52 functions as a safety device for making sure that the shoe 34 is maintained in an elevated position even though one of the lines 32 or 30 becomes defective or there is a leak in the cylinder 28. Forward of the pivot pin 48 and also the pivot pin 26 there is a pivot pin 56. Mounted on this pivot pin 56 is a safety leg 58. On the lower end of the safety leg 58 there is a wheel or roller 60 rotatably mounted on the shaft 62. The shoe 34, on the upper surface of the base 36, has a receiver 64 for fitting with and receiving the wheel 60. Mounted back of the receiver 64 is a rotatable lever 66. The lever 66 is pivoted at 68 to the side 38 of the shoe 34. In operation, as a safety device, the supporting leg 28 may be extended so as to raise the trailer, and then the safety leg 58 rotated so that the wheel 60 fits with the receiver 64, and then the supporting leg retracted. To remove the leg 58 the supporting leg is again extended so that the wheel 60 is not in contact with the receiver 64. Then, a person may step on the lever 66 so as to rotate forwardly the leg 58 so that it is out of contact with the receiver 64 and also out of contact with the shoe 34. Then, the supporting leg 28 may be retracted so as to allow the trailer to be lowered.

Figure 1:
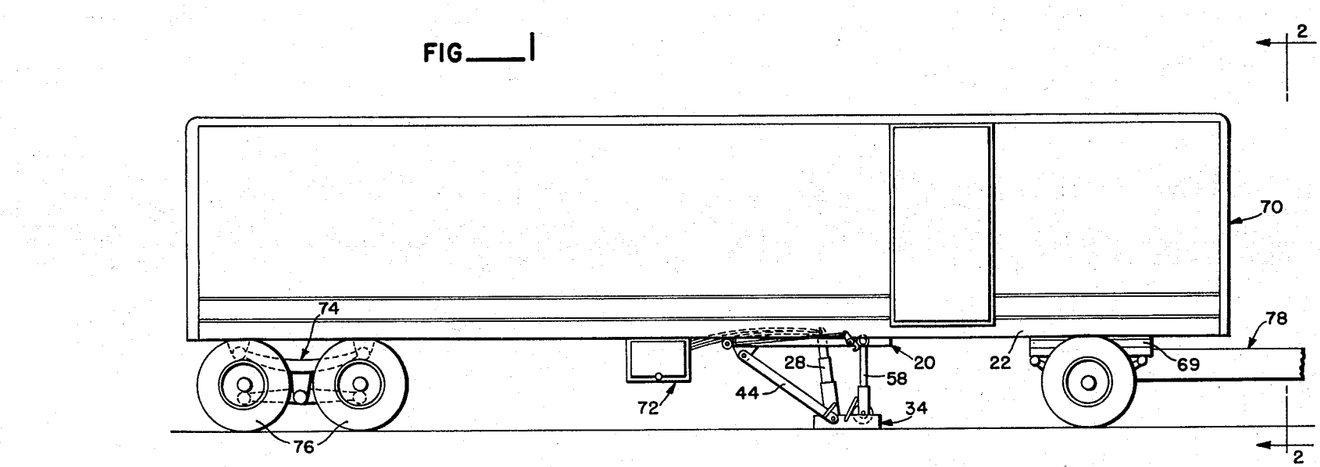
FIGURE 1 is a side-elevational view of a specific embodiment of the invention constructed in accordance with the preferred teachings thereof and shows the same as applied to a van-type trailer.
Figure 4:
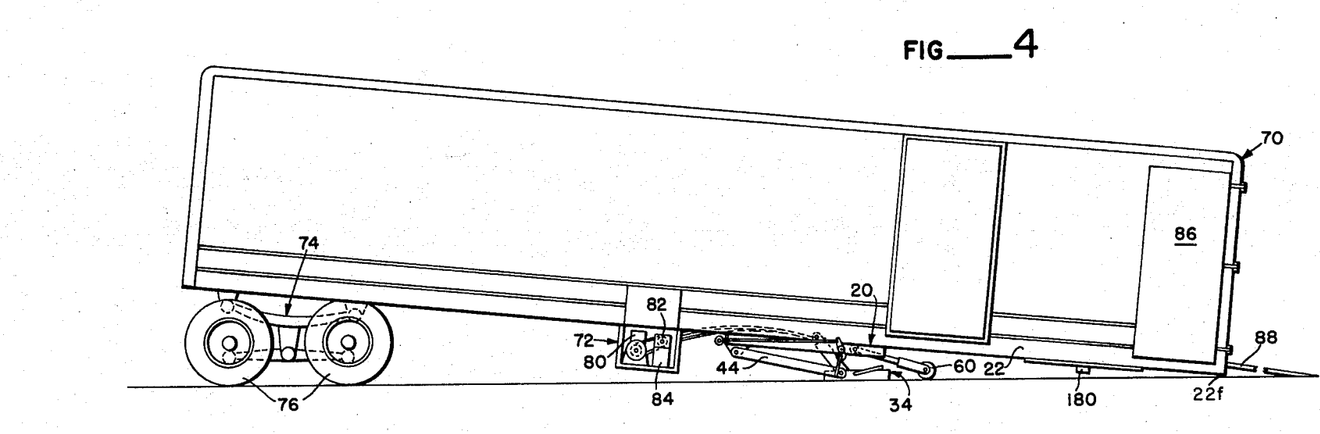
FIGURE 4 is a side-elevational view of a van-type trailer with the tractor removed and the fluid actuated supporting leg in a retracted state so that the front of of the trailer is on the ground or earth and with the ramp leading from the bed of the trailer to the ground.

In FIGURE 1 there is illustrated the fluid actuated supporting leg as attached to a van-type trailer 70. The trailer 70 has a bed 22. Mounted on the underneath side of the bed 22 is a housing 72. The housing 72 houses a gasoline driven motor 80, a pump 82, a reservoir 84 and a four-way valve 77 for connecting with the hydraulic cylinder 28 or 170. A hydraulic line 79 leads from the pump 73 to the valve 77 and a hydraulic line 81 leads from the reservoir 75 to the valve 77. In this manner there is provided an independent power source and a source of hydraulic fluid for actuating the cylinders 28 and 170. It is seen that in the back of the trailer 70 there is provided a rear wheel carriage 74 which is connected with the base 22. The rear wheel carriage carries a multiplicity of tires and wheels 76. Near the front of the trailer 70, and attached to the underneath side of the base 22, there is the usual kingpin, see FIGURES 4 and 5 for connecting with a fifth wheel 69 on a tractor 78. In FIGURE 1 the cylinder 28 of the supporting leg is in an extended position with the leg 58 in a safety position. The tractor 78 is about to be uncoupled from the trailer 70. With the uncoupling of the tractor from the trailer the cylinder 28 will be extended, the safety leg 58 kicked out of position, and then the cylinder 28 retracted so that the front end of the trailer is lowered and the rear end raised as is illustrated in FIGURE 4.

Figure 2:
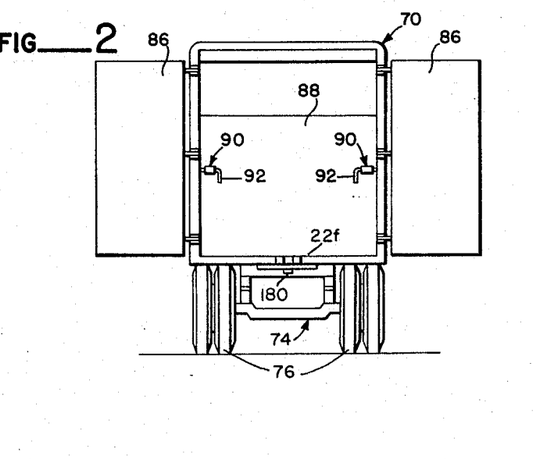
FIGURE 2 is an elevational view of the van-type trailer and shows a front door of the trailer in an open state to illustrate the ramp which is in position on the housing on the front of the trailer.
Figure 3:
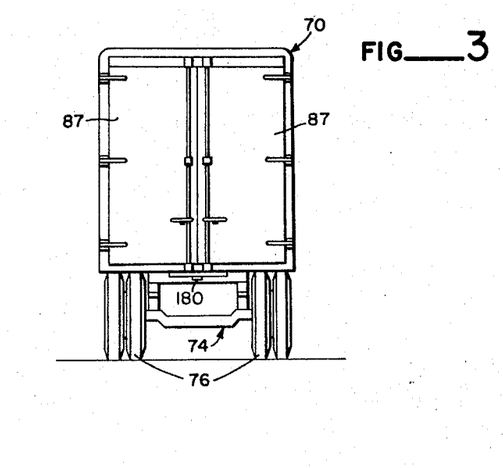
FIGURE 3 is an elevational view of the rear of the trailer and illustrates the rear doors closed.
Figure 5:
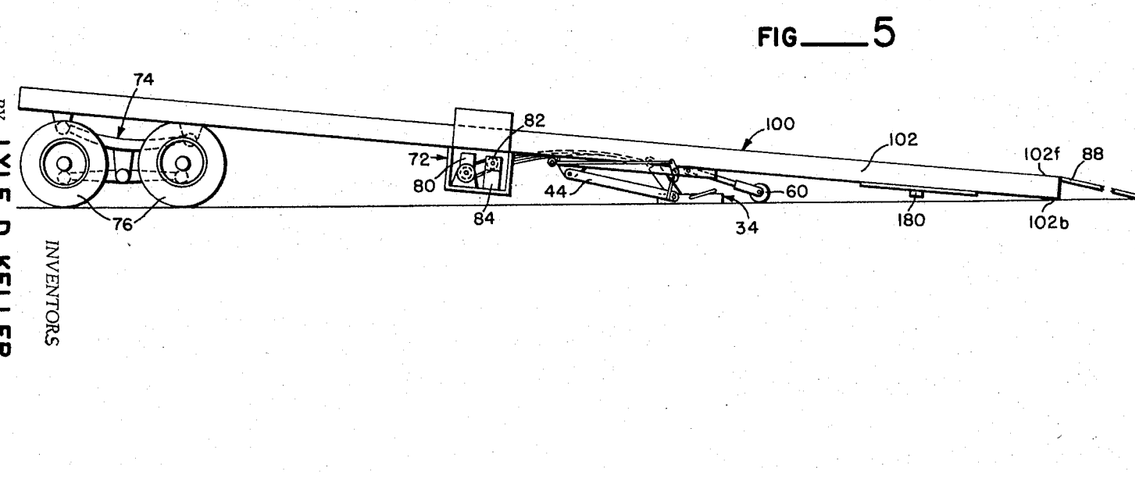
FIGURE 5 is a side-elevational view of a flat bed trailer with the tractor removed and the fluid actuated supporting leg in a retracted state so that the front of the trailer is on the ground and with the ramp leading from the bed of the trailer to the ground.

It is seen that the van-type trailer 70 has two front doors 86 which swing outwardly, and that in FIGURE 2 the two doors are in an open position so as to show a ramp 88 positioned in the front of the trailer. There are locking means 90 for locking the ramp in position in the front of the housing. The locking means comprises a shaft and lever 92 which are connected with the ramp 88. The shaft goes into an opening in the side of the frame around the opening in the front of the truck. FIGURE 3 is a view of the rear of the truck and shows two rear doors 87 in a closed state. The doors 86 on the front of the van and the doors 87 on the rear are substantially the same. In FIGURE 5 it is seen that the ramp 88 is lowered and leads from the floor of the trailer to the ground.

The trailer illustrated in FIGURES 1, 2, 3, 4 and 5 may be considered to be a forty-foot trailer. This trailer has only a rear wheel carriage 74 and does not have a front wheel carriage or an intermediate wheel carriage. The front end of the trailer while being moved is supported by a tractor 78. The tractor connects with the trailer by means of the conventional fifth wheel on the tractor and the kingpin on the trailer. The trailer may be supported by the fluid actuated supporting leg and the safety leg 58 in the absence of the tractor 78. As has been previously explained the trailer 70 may be lowered so that the front end is near the ground or resting on the ground and the rear end is in an elevated position. From experience it has been found that the slope of the bed of the trailer should not be over approximately five percent. With a forty foot trailer it is thereby possible to have the front end touching the ground or resting on the ground and still have a slope of approximately five percent. With shorter trailers other arrangements have to be made.

In FIGURE 5 there is illustrated a flat bed trailer 100 having the raising and lowering device 20 attached to the underneath side of the bed near the front central portion of the same. This trailer has a flat bed 102, a rear wheel carriage 74, and a ramp 88. Flat bed 102 also has a bottom 102b which may be rested upon the ground, and on its upper side bed 102 has a floor surface 22f. As is seen in FIGURE 5 with the trailer uncoupled from the tractor and the supporting leg retracted the front of the trailer is touching the ground and the ramp 88 leads from the bed 102 to the ground. In this manner it is possible to move a pallet having cases of merchandise directly from the ground onto the floor surface 102f of the trailer and, conversely, move pallets from the trailer to the ground.

Figure 8:
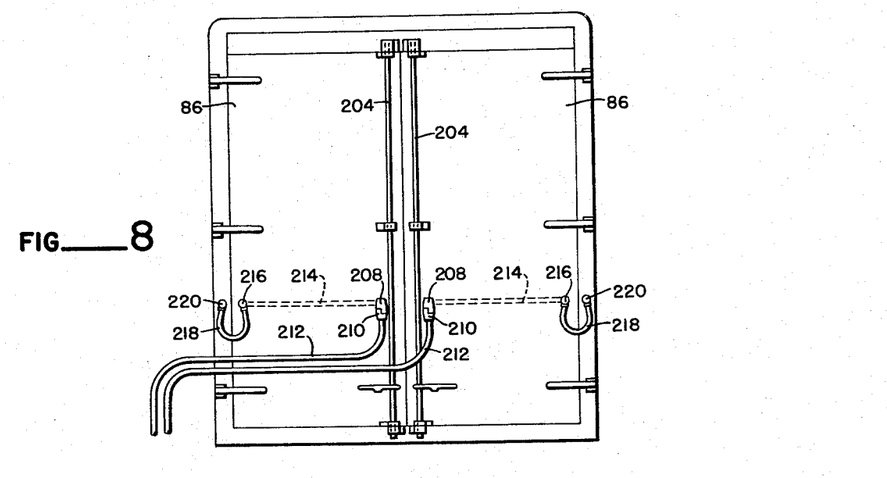
FIGURE 8 is a front-elevational view of the van-type trailer having front doors, and illustrates the doors in a closed state with pneumatic brake lines connecting to the front doors and flexible pneumatic lines between the front doors and the body of the van.
Figure 9:
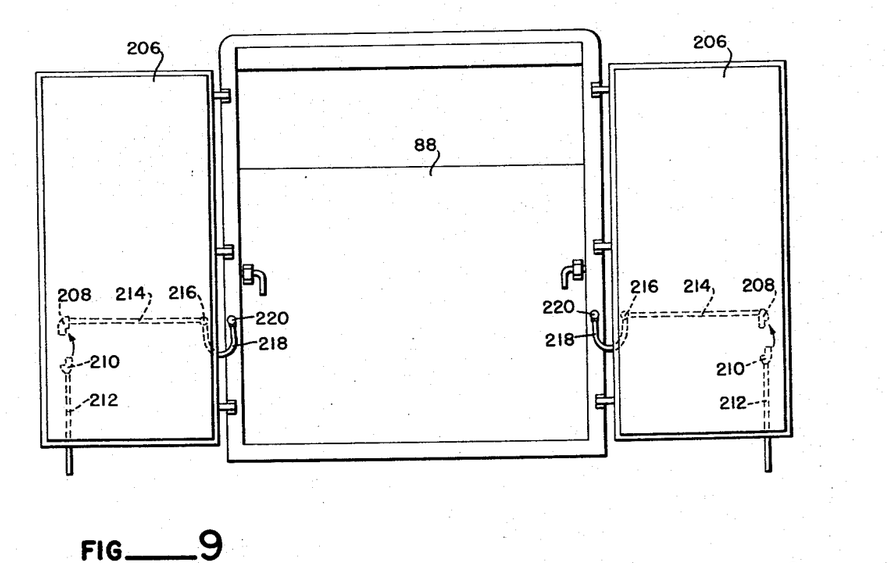
FIGURE 9 is a front-elevational view of the van-type trailer having the front doors in an open state and the flexible pneumatic lines between the front doors and the body of the van; and, FIGURE 10 is a schematic outline of the pneumatic brake system for the trailer and also safety controls for the pneumatic system and the supporting leg.

In FIGURES 8 and 9 there is illustrated the front of a van-type trailer and the connections to the pneumatic brake system or a fluid actuated system. More particularly, this is trailer 70 having front doors 86, as previously explained. The trailer 70 has a body which will be referred to as sides 200. Hinges 202 connect the body or sides 200 to the doors 86, so that the doors are free to swing. On the front of the doors there are the conventional rod locking means 204. The doors have a facing panel, which is not numbered, and also on the inside have a backing panel 206. On the front of the doors, and near the free edge of the same, there is a pneumatic connector 208. This connector 208 may be of conventionl construction. Mating with this connector 208 is a connector 210 on the end of the flexible pneumatic line 212. It is to be understood that the flexible line 212 is connected to the pneumatic brake system of the tractor. It is seen that in the door 86 there is a pneumatic line 214. The connector 208 and the line 214 are integral. The line 214 is illustrated is phantom in FIGURES 8 and 9 to illustrate that it is positioned between the front panel of the door 86 and the backing panel 206. Near the fixed edge or that edge of the door close to the sides 200, there is an adapter 216. The adapter 216 and the line 214 are integral. Connecting to the adapter 216 is a flexible pneumatic line 218. The line 218 and the adapter 216 are integral. The line 218 connects with another adapter 220. The adapter 220 is on the front of the sides 220 or the body of the trailer. It is to be understood that the adapter 220 connects with the pneumatic system of the trailer. In this regard, see FIGURE 10.

Figure 10:
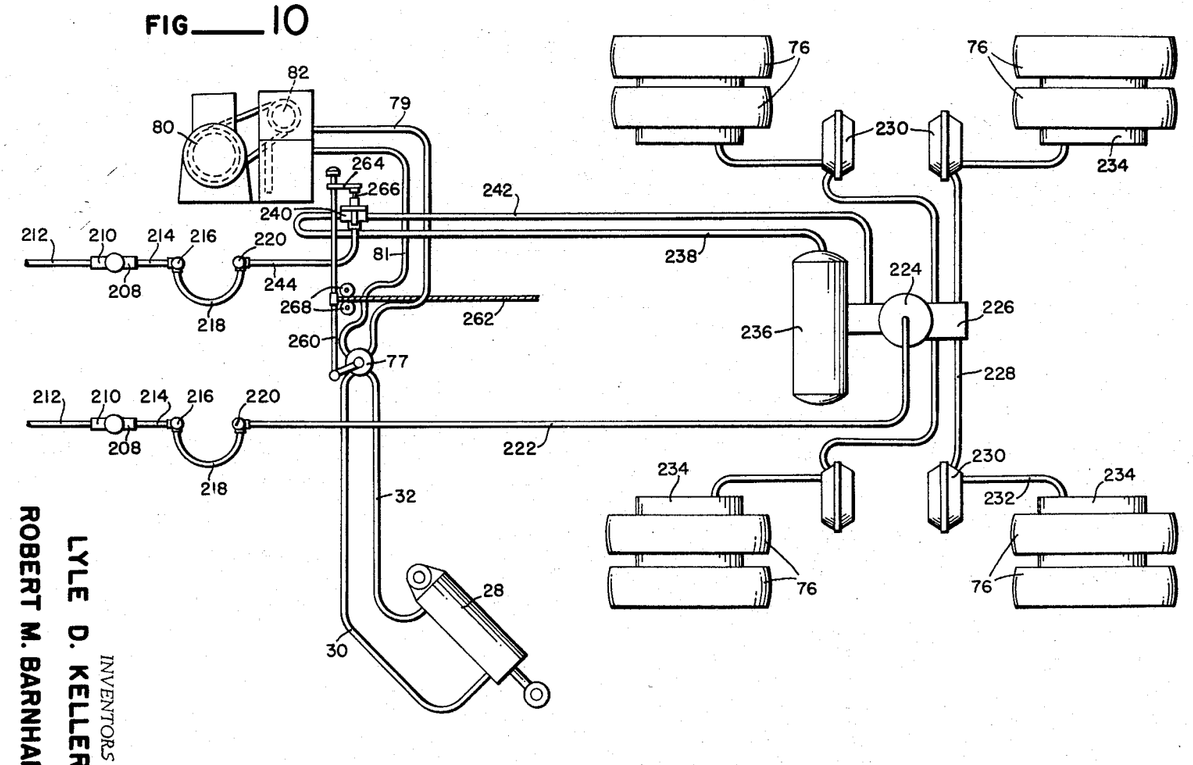

One of the adapters 220 connects with the pneumatic line 222 in the body of the van. The line 222 connects with the valve 224 of the pneumatic brake system. The valve 224 connects with a pneumatic manifold 226. Piping or tubing 228 connects with the manifold 226 and leads to a brake-application chamber 230. It is seen that there are four tubes 228 and four brake-application chambers 230. A tube or pipe 232 connects the air chamber 230 with the brake 234. The components 222, 224, 226, 228, 230, 232 and 234 are conventional components of the pneumatic brake system and may be purchased commercially. It is also seen that the pneumatic brake system comprises an air pressure tank 236, a line or pipe 238 connecting the tank 236 with a Williams valve 240. The valve 240 is connected by means of a pipe or tube 242 with a manifold 226. It is seen that the valve 240 also connects by means of a pipe or tube 224 with another adapter 220. The components 238, 240, and 242 are conventional components of the pneumatic brake system.

The operation of the brake system is as follows: With the air pressure on the valve 224, the air chambers 230 are activated so that the brakes 234 are off or in an unlocked state or in a braking state. When the trailer is unhooked from the tractor and there is no air pressure on the valve 234, the brakes are locked and it is impossible to move the trailer. Without air pressure on the valve it is seen that the trailer will remain where it is unless it is dragged to a new location. In order to release the brakes without air pressure from an outside force such as a tractor, there is provided the air reservoir 236 and the associated piping 238, 242 and the Williams valve 240. By opening the valve 240, the air pressure from the tank 236 enters the manifold system 226 so as to trip the air chambers 230 and release the brakes 234. This releasing of air pressure from the tank 236 is for a very short time so as to release the brakes 234 and move the trailer.

The illustration of the pneumatic system in FIGURE 10 and the purpose are now more fully brought forth upon reference to FIGURES 1 and 4. In FIGURE 1 it is seen that the trailer 70 is about to be uncoupled from the tractor 78. The supporting leg 20 is in an extended state so as to be able to support the trailer. With the uncoupling of the tractor from the trailer, the trailer may be lowered, as previously explained, by retracting the supporting leg so that the front end of the trailer is juxtapositioned and is supported on the ground as illustrated in FIGURE 4. It is to be remembered that the brakes are locked and that the trailer cannot move. Now, it is desired to raise the trailer by extending the supporting leg. It is seen that the supporting leg rotates around a pivot 26. On a 40 foot trailer, the shoe 38, or another way to consider this, the pivot 40 travels through an arc and travels approximately ten inches toward the front of the trailer from the extended state of the leg to the retracted state of the leg. With the brakes locked and the rear wheels 76 firmly positioned on the ground, if the supporting leg is extended, it is seen that there is a ten-inch travel for the shoe but there is no provision for the chassis to take up this ten-inch travel. Remember, the shoe is firmly positioned on the ground and the wheels 76 are firmly positioned on the ground and with a ten-inch travel, the chassis of the trailer may be buckled. In order to prevent this buckling of the chassis of the trailer, the brakes are released. This is made possible by actuating the Williams valve 240 so as to allow air pressure from the tank 236 to go to the manifold 226 and from there to trip the air chambers 236 to release the brakes 234. The trailer is prevented from moving as the shoe 38 functions as a brake during the period of time that the leg is being extended. In certain instances with the extending of the leg the tires may be skidded to accommodate this ten-inch travel of the shoe and the trailer.

An interlock system is provided to insure that the cylinder 28 or the cylinder 170 will not be extended while the hook 52 is engaged with the yoke 48 or the yoke 147. In FIGURE 10 there is schematically illustrated this interlock system. There is a control rod 260. This rod is connected to the valve 77 for controlling the flow of hydraulic fluid to the cylinders 28 and 170. Also, there is connected a flexible cable 262 to the rod 260. The cable 262 connects with the rod 54. On the free end of the rod 54 there is a loop 55 for ease of pulling the rod 54 and disengaging the hook 52 from the yoke. On the rod 260 there is an attached outwardly directed lug 264. By pushing in the rod 260 the lug 264 contacts actuating lever 266 of the valve 240 so as to open it. By pushing in the rod 260, the valve 77 is actuated so that the cylinders 28 or 170 are actuated and the supporting leg is extended. In another situation the hook 52 is engaged in a locking relation with the yoke and the supporting leg is in a raised position. To lower the supporting leg, the rod 260 is pushed inwardly so that the valve 77 is actuated so that the supporting leg is extended and the cable 262 is pulled, the rod 54 is pulled and the hook 52 is disengaged from the yoke. With the trailer on the tractor, the rod 260 must not be pushed in so far as to actuate the valve 240. It is seen that there are two rollers or studs 268 between which the cable 262 passes.

In all embodiments, and referring particularly to FIGS. 4 and 5, it is noted that kingpin 180 is set back from the front end of the trailer at a location where, when the front end of flat bed bottom 22b or 102b rests upon the ground, the distance between the flat bed bottom 22b or 102b is greater than the downward extent of the kingpin. This prevents the kingpin from resting on the ground, thereby eliminating damage to or dirtying of the kingpin, and also permits full engagement of the entire width of the front edge of bed bottom 22b or 102b with the ground.

From the foregoing it is seen that by raising and lowering a trailer by any means, we have provided a faster and easier means of loading and unloading a trailer. As an example: The driver parks the tractor and semi-trailer in the most practical position in relation to the unloading area. He then lowers the powered landing gear or supporting leg, uncouples the tractor and moves it aside. Then he opens the doors on the front of the semi-trailer, which gives a large unobstructed opening, and lowers the front of the trailers to the ground. At this time he unlatches the hinged ramp in the front door opening and lowers the ramp to the ground. Now, the driver takes a pallet jack and wheels the pallets into the receiving area with no delay at all. After the trailer is unloaded or loaded, whichever the case may be, the driver raises the trailer by means of the powered landing gear to coupling position, couples the tractor and is on his way. Of course, this includes any type of load whether barrels, crates or nonpallatized cartons. Also the reverse is true of loading the invented trailer from the ground.

In this regard there may be loaded cartons. The cartons may be of different sizes from a small one to the van of the trailer. More particularly, there may be utilized a flat deck trailer and the van may be the carton having dimensions, for example, a width of eight feet, a length of forty feet and a height of eight to ten feet. Upon reaching the unloading destination the front end of the flat deck trailer is lowered, the van carton may be rolled off the trailer to an unloading area. The van carton may be of a special construction so that it can roll off the trailer, or there may be receiving equipment at the unloading area to assist in the removal of the van carton from the trailer. Of course, with smaller cartons the same may be removed with appropriate equipment such as a pallet jack or a platform jack to name a few. The smaller cartons may be carried on a flat bed trailer or in a van-type trailer.

The danger of a fall from, or failure of the other types of lifts is eliminated. The wear and tear and maintenance is greatly reduced because this mechanism operates only once to load or unload an entire semi-trailer as contrasted with a lift gate. The cost of unloading is greatly reduced because the driver performs the entire task in a fraction of the time required by the other methods.

As an illustration of the saving of both time and the cost of loading and unloading of a trailer a comparison of our method and apparatus is made with conventional methods and apparatus. With conventional methods and apparatus in an eight hour day two conventional loads of merchandise may be loaded and unloaded with the aid of a driver and a loader, and two or more warehousemen at the store. As contrasted with this by using our method and apparatus, one driver by himself, doing both the loading and the unloading, can handle approximately three loads or one-and-one-half times the amount of merchandise with the elimination of a loader and two or more warehousemen at the store. The expensive tractor and semi-trailer is not tied up as long and therefore is able to make more trips in any given period of time. From the foregoing description of the method, it is seen that there results an ease of maneuvering the trailer by a tractor for both loading and unloading purposes and also there results an elimination of the need for a dock at the loading and unloading area. The trailer can be maneuvered by a tractor in a parking lot, the tractor uncoupled and the trailer unloaded or loaded in a field. This may have a special advantage suitable for military purposes. For example, on maneuvers it is possible to both load and unload a trailer quicker by wheeling the material onto the trailer than by lifting a load by means of a lift gate on the back of a trailer or by the use of a fork lift for lifting a load onto the trailer. With our invention it is possible to replace a hand truck with a hand or power operated fork-lift truck and thereby instead of carrying five to seven cases onto the trailer by means of a hand truck, it is possible to carry approximately thirty-five or more cases onto the trailer. The thirty-five or more cases can be loaded onto a pallet and a warehouseman with a hand or power operated fork-lift truck can wheel the pallet onto the trailer. With our invention it is possible to deliver the case goods or groceries to a store at night so as to not interfere with business during regular store hours. The pallets are wheeled from the trailer directly to the counter in the aisle and immediately or the next day the clerks may unload the groceries onto the shelves. It is seen that the case goods of groceries can be loaded onto the pallet at the warehouse, transported to the retail store, and then moved direcly to any area within the store. With reference to the described conventional methods of handling merchandise it is seen that there is saved manpower in the loading and unloading of the merchandise and also a saving in the floor area of the retail store. As a result of this it is possible, for a given store selling area, to put up a less expensive store or else for a given amount of money to put up a store having a larger distribution and selling area. To expand on this, in a given area of a lot a certain part of the lot is reserved for customer parking, a certain part is reserved for loading and unloading of merchandise to the store and case goods to the store, and a certain part for the store itself. The store comprises both a warehousing area and a store selling area. With our invention it is possible to decrease the size of the loading and unloading area. As a result it is possible to have a larger customer parking area or a larger store for a given lot. Further, because of the decrease in the warehousing area it is possible to convert some of the warehousing area or design some of the warehousing area into a store selling area. The result is that with a larger store selling area it is possible to increase sales.

Having presented our invention what we claim is:

1. A semi-trailer, said semi-trailer having a rear wheel carriage, said semi-trailer having a van, said semi-trailer having a front, on the underneath of the semi-trailer there being a kingpin, said kingpin being spaced rearwardly of the front to leave the front free and clear, said van having front doors, a ramp removably attached to the front of the semi-trailer, with the front of the semi-trailer in a lowered position said ramp extending from the semi-trailer to the ground, said semi-trailer having a jack means between the front and the rear wheel carriage for raising and lowering the front of the semi-trailer, said jack means comprising a fluid actuated cylinder having a plunger, a shoe, said plunger being pivoted to the semi-trailer and said cylinder being pivoted to the shoe, a stabilizer bar, one end of said stabilizer bar being pivoted to the semi-trailer and the other end of said stabilizer bar being pivoted to the shoe, a safety leg pivoted to the semi-trailer, said shoe being capable of receiving the free end of the safety leg, said shoe having a large bearing area for distributing the load of the semi-trailer, said semi-trailer having a pneumatic brake system, said pneumatic brake system comprising a manifold, a tank for storing gas under pressure, and a line leading from the tank to the manifold, and a valve in said line to regulate the flow of gas from the tank to the manifold.

2. A semi-trailer, said semi-trailer having a rear wheel carriage, said semi-trailer having a van, said semi-trailer having a front, on the underneath of the semi-trailer there being a king pin, said king pin being spaced rearwardly of the front to leave the front free and clear, a ramp removably attached to the front of the semi-trailer, with the front of the semi-trailer in a lowered position said ramp extending from the semi-trailer to the ground, said semi-trailer having a jack means between the front and the rear wheel carriage for raising and lowering the front of the semi-trailer, said jack means comprising a fluid actuated cylinder having a plunger, a shoe, said plunger being pivoted to the semi-trailer and said cylinder being pivoted to the shoe, a stabilizer bar, one end of said stabilizer bar being pivoted to the semi-trailer and the other end of said stabilizer bar being pivoted to the shoe, a safety leg pivoted to the semi-trailer, said shoe being capable of receiving the free end of the safety leg, said shoe having a large bearing area for distributing the load of the semi-trailer, said semi-trailer having a pneumatic brake system, said pneumatic brake system comprising a manifold, a tank for storing gas under pressure, a line leading from the tank to the manifold, and a valve in said line to regulate the flow of gas from the tank to the manifold, said semi-trailer having a door on the front of the van, said door being hinged to the semi-trailer, a pneumatic line in the door, a pneumatic line in the van of the semi-trailer, and a connection between the pneumatic line in the door and the pneumatic line in the van of the semi-trailer to allow the door to move.

3. A semi-trailer, said semi-trailer having a rear wheel carriage, said semi-trailer having a van, said semi-trailer having a front, on the underneath of the semi-trailer there being a king pin, said king pin being spaced rearwardly of the front to leave the front free and clear, a ramp removably attached to the front of the semi-trailer, with the front of the semi-trailer in a lowered position said ramp extending from the semi-trailer to the ground, said semi-trailer having a jack means between the front and rear wheel carriage for raising and lowering the front of the semi-trailer, said jack means comprising a fluid actuated cylinder having a plunger, a shoe, said plunger being pivoted to the semi-trailer and said cylinder being pivoted to the shoe, a stabilizer bar, one end of said stabilizer bar being pivoted to the semi-trailer and the other end of said stabilizer bar being pivoted to the shoe, a safety leg pivoted to the semi-trailer, said shoe being capable of receiving the free end of the safety leg, said shoe having a large bearing area for distributing the load of the semi-trailer, said semi-trailer having a pneumatic brake system, said pneumatic brake system comprising a manifold, a tank for storing gas under pressure, a line leading from the tank to the manifold, and a valve in said line to regulate the flow of gas from the tank to the manifold, said semi-trailer having two doors on the front of the van, each of said doors being hinged to the semi-trailer, a pneumatic line in each of the doors, a pneumatic line in the van of the semi-trailer for each of the lines in the doors, and a connection between each of the pneumatic lines in the doors and a corresponding line in the van of the semi-trailer to allow the doors to move.

4. A semi-trailer, said semi-trailer having:
  (A) a rear wheel carriage;
  (B) said trailer having a van;
  (C) said trailer having a front;
  (D) on the underneath of the semi-trailer there being a king pin;
  (E) said king pin being spaced rearwardly of the front to leave the front free and clear;
  (F) said van having front doors;
  (G) said trailer having a jack means between the front and the rear wheel carriage for raising and lowering the front of the trailer;
  (H) said jack means comprising a fluid actuated cylinder having a plunger;
  (I) a shoe;
  (J) said plunger being pivoted to the trailer and said cylinder being pivoted to the shoe;
  (K) a stabilizer bar;
  (L) one end of said stabilizer bar being pivoted to the semi-trailer and the other end of said stabilizer bar being pivoted to the shoe;
  (M) a safety leg pivoted to the trailer;
  (N) said shoe being capable of receiving the free end of the safety leg;
  (O) said shoe having a large bearing area for distributing the load of the semi-trailer;
  (P) said trailer having a pneumatic brake system;
  (Q) said pneumatic brake system comprising a manifold;
  (R) a tank for storing gas under pressure;
  (S) a line leading from the tank to the manifold; and,
  (T) a valve in said line to regulate the flow of gas from the tank to the manifold.

5. A semi-trailer, said semi-trailer having:
  (A) a rear wheel carriage;
  (B) said semi-trailer having a van;
  (C) said semi-trailer having a front;
  (D) on the underneath of the semi-trailer there being a king pin;
  (E) said king pin being spaced rearwardly of the front to leave the front free and clear;
  (F) said van having front doors;
  (G) said semi-trailer having a jack means between the front and the rear wheel carriage for raising and lowering the front of the trailer;
  (H) said jack means comprising a fluid actuated cylinder having a plunger;
  (I) a shoe;
  (J) said plunger being pivoted to the trailer and said cylinder being pivoted to the shoe;
  (K) a stabilizer bar;
  (L) one end of said stabilizer bar being pivoted to the semi-trailer and the other end of said stabilizer bar being pivoted to the shoe;
  (M) a safety leg pivoted to the semi-trailer;
  (N) said shoe being capable of receiving the free end of the safety leg;
  (O) said shoe having a large bearing area for distributing the load of the semi-trailer;
  (P) said semi-trailer having a pneumatic brake system;
  (Q) said pneumatic brake system having a manifold;
  (R) a tank for storing gas under pressure;
  (S) a line leading from the tank to the manifold;
  (T) a valve in said line to regulate the flow of gas from the tank to the manifold;
  (U) said semi-trailer having a door on the front of the van;
  (V) said door being hinged to the semi-trailer;
  (W) a pneumatic line in the door;
  (X) a pneumatic line in the van of the semi-trailer; and,
  (Y) a connection between the pneumatic line in the door and the pneumatic line in the van of the semi-trailer to allow the door to move.

6. A semi-trailer, said semi-trailer having:
  (A) a rear wheel carriage;
  (B) said semi-trailer having a van;
  (C) said semi-trailer having a front;
  (D) on the underneath of the semi-trailer there being a king pin;
  (E) said king pin being spaced rearwardly of the front to leave the front free and clear;
  (F) said van having front doors;
  (G) said trailer having a jack means between the front and the rear wheel carriage for raising and lowering the front of the semi-trailer;
  (H) said jack means comprising a fluid actuated cylinder having a plunger;
  (I) a shoe;
  (J) said plunger being pivoted to the semi-trailer and said cylinder being pivoted to the shoe;
  (K) a stabilizer bar;
  (L) one end of said stabilizer bar being pivoted to the semi-trailer and the other end of said stabilizer bar being pivoted to the shoe;
  (M) a safety leg pivoted to the semi-trailer;
  (N) said shoe being capable of receiving the free end of the safety leg;
  (O) said shoe having a large bearing area for distributing the load of the semi-trailer;
  (P) said semi-trailer having a pneumatic brake system;
  (Q) said pneumatic brake system comprising a manifold;
  (R) a tank for storing gas under pressure;
  (S) a line leading from the tank to the manifold;
  (T) and a valve in said line to regulate the flow of gas from the tank to the manifold;
  (U) said semi-trailer having two doors on the front of the van;
  (V) each of said doors being hinged to the semi-trailer;
  (W) a pneumatic line in each of the doors;
  (X) a pneumatic line in the van of the semi-trailer for each of the lines in the doors; and,
  (Y) a connection between each of the pneumatic lines in the doors and a corresponding line in the van of the semi-trailer to allow the door to move.

7. A semi-trailer comprising a bed having front and rear ends, a bottom, and a floor surface above said bottom; a rear wheel carriage disposed beneath a rear portion of said bed and mounting the same for swinging movement between a first position in which said bed extends generally horizontally and the front end is spaced above the ground and a second position in which said bed inclines downwardly and forwardly from the rear end and said bottom at the front end is disposed adjacent the ground; a jack mechanism disposed beneath said bed between said ends, said jack mechanism being extensible downwardly from the bed for supporting the same in said first position and being retractable upwardly for lowering said bed to said second position; a kingpin disposed beneath said bed between the front end thereof and said jack mechanism; a van on said bed, said van having front and rear ends corresponding to the front and rear ends of said bed, said van also having sides, door means movably mounted across the front of said van for opening and closing the same, a generally flat ramp substantially co-extensive in width with the interior of said van at the front end thereof, said ramp being disposable across the front of said van immediately rearwardly of said door means and means for releasably connecting the sides of said ramp with the panel sides of said van, whereby to protect said door means against shifting cargo within said van when said bed is lowered from said first position to the second position.

8. A semi-trailer comprising a bed having front and rear ends, a bottom, and a floor surface above said bottom; a rear wheel carriage disposed beneath a rear portion of said bed and mounting the same for swinging movement between a first position in which said bed extends generally horizontally and the front end is spaced above the ground and a second position in which said bed inclines downwardly and forwardly from the rear end and said bottom at the front end is disposed adjacent the ground; a jack mechanism disposed beneath said bed between said ends, said jack mechanism being extensible downwardly from the bed for supporting the same in said first position and being retractable upwardly for lowering said bed to said second position; a kingpin disposed beneath said bed between the front end thereof and said jack mechanism for supporting the front end of the bed on the fifth wheel of a tractor; a fluid operated brake system for said rear wheel carriage; a van on said bed, said van having front and rear ends corresponding to the front and rear ends of said bed, said van also having sides and a pair of swinging doors pivotally mounted on said panel sides respectively at the front of said van for opening and closing the same, said fluid operated brake system including at least one pneumatic conduit having at least one part thereof supported on one of the van sides and another part supported on one of said doors, a bendable connection between the two parts, and a fluid coupling on the door-supported part whereby a cooperating fluid conduit on the tractor may be coupled to the door-supported part when the door supporting the same is closed, and whereby the door-supported part and coupling are free and clear of the area immediately in front of the van when the door supporting the same is open.

9. The combination claimed in claim 7, the downward extent of said kingpin being less than the distance between the bed at the location thereof and the ground when said bed is in said second position, whereby to avoid engagement of the kingpin with the ground when said jack mechanism is retracted to lower said front end from the first position to the second position.

References Cited by the Examiner

UNITED STATES PATENTS

| | | | |
|---|---|---|---|
| 2,150,701 | 3/1939 | Reid | 254—86 |
| 2,190,252 | 2/1940 | Brant et al. | 214—506 X |
| 2,228,534 | 1/1941 | Reid | 280—33.1 |
| 2,232,754 | 2/1941 | Winn | 280—33.1 |
| 2,267,509 | 12/1941 | Strong | 296—24 |
| 2,361,040 | 10/1944 | Larsen | 268—64 |
| 2,400,652 | 5/1946 | Morris | 280—150.5 |
| 2,431,436 | 11/1947 | Townsend | 254—86 |
| 2,459,508 | 1/1949 | Dourte | 214—506 X |
| 2,591,226 | 4/1952 | Askue | 214—506 X |
| 2,725,994 | 12/1955 | Martin | 214—85 |
| 2,808,256 | 10/1957 | Landert | 268—64 |
| 2,851,181 | 9/1958 | Thomann | 214—506 |
| 2,865,658 | 12/1958 | Dubuque | 280—475 |
| 3,004,682 | 10/1961 | Bertolini et al. | 280—423 X |
| 3,075,790 | 1/1963 | Hansen et al. | 280—475 |
| 3,104,891 | 9/1963 | Dalton | 254—86 X |

FOREIGN PATENTS

| | | |
|---|---|---|
| 1,062,775 | 12/1953 | France. |
| 445,239 | 4/1936 | Great Britain. |
| 607,555 | 9/1948 | Great Britain. |

GERALD M. FORLENZA, *Primary Examiner.*

HUGO O. SCHULZ, *Examiner.*

A. J. MAKAY, *Assistant Examiner.*